US009103903B2

(12) United States Patent
Funayama et al.

(10) Patent No.: US 9,103,903 B2
(45) Date of Patent: Aug. 11, 2015

(54) APPROACHING VEHICLE DETECTING SYSTEM AND APPROACHING VEHICLE DETECTING METHOD

(75) Inventors: Ryuji Funayama, Yokohama (JP); Jun Sato, Susono (JP); Hisashi Satonaka, Susono (JP); Keiichi Yamada, Nisshin (JP); Hideki Banno, Tokai (JP); Osami Yamamoto, Nagoya (JP); Kensaku Asahi, Nagoya (JP); Akira Ogawa, Tokyo (JP)

(73) Assignees: TOYOTA JIDOSHA KABUSHIKI KAISHA, Aichi-ken (JP); MEIJO UNIVERSITY, Nagoya (JP)

( * ) Notice: Subject to any disclaimer, the term of this patent is extended or adjusted under 35 U.S.C. 154(b) by 0 days.

(21) Appl. No.: 14/111,377

(22) PCT Filed: Apr. 13, 2012

(86) PCT No.: PCT/IB2012/000743
§ 371 (c)(1),
(2), (4) Date: Jan. 13, 2014

(87) PCT Pub. No.: WO2012/140498
PCT Pub. Date: Oct. 18, 2012

(65) Prior Publication Data
US 2014/0136096 A1 May 15, 2014

(30) Foreign Application Priority Data

Apr. 15, 2011 (JP) .................................. 2011-091200

(51) Int. Cl.
*G01S 3/808* (2006.01)
*G01S 11/14* (2006.01)

(52) U.S. Cl.
CPC ............... *G01S 3/808* (2013.01); *G01S 3/8083* (2013.01); *G01S 11/14* (2013.01)

(58) Field of Classification Search
CPC ........ G01S 3/808; G01S 11/14; G01S 3/8083
USPC ........................................... 701/300
See application file for complete search history.

(56) References Cited

U.S. PATENT DOCUMENTS 4,333,170 A   6/1982  Mathews et al.
4,626,850 A * 12/1986  Chey ............................ 340/903

(Continued)

FOREIGN PATENT DOCUMENTS

CN       1829395 A     9/2006
JP      05-092767 U    12/1993

(Continued)

*Primary Examiner* — Mary Cheung
*Assistant Examiner* — Anne Mazzara
(74) *Attorney, Agent, or Firm* — Sughrue Mion, PLLC

(57) ABSTRACT

An approaching vehicle detecting system that detects an approaching vehicle on the basis of sounds collected by a plurality of sound collectors mounted on a host vehicle determines whether a transverse moving direction of a sound source detected by the plurality of sound collectors is a direction approaching the host vehicle, determines whether a vertical position of the sound source detected using the plurality of sound collectors is in the same plane as that of the host vehicle, and detects that sound source as the approaching vehicle when it is determined that the transverse moving direction of the sound source is the direction approaching the host vehicle and the vertical position of the sound source is in the same plane as that of the host vehicle.

14 Claims, 11 Drawing Sheets

(56) References Cited

U.S. PATENT DOCUMENTS

| | | |
|---|---|---|
| 6,195,608 B1 | 2/2001 | Berliner et al. |
| 2002/0167862 A1* | 11/2002 | Tomasi et al. ............... 367/118 |
| 2006/0196272 A1 | 9/2006 | Sugiura et al. |
| 2010/0214086 A1 | 8/2010 | Yoshizawa et al. |
| 2010/0228482 A1 | 9/2010 | Yonak |

FOREIGN PATENT DOCUMENTS

| | | |
|---|---|---|
| JP | 2003-271196 A | 9/2003 |
| JP | 2005-010938 A | 1/2005 |
| JP | 2006-167833 A | 6/2006 |
| WO | 2010/035434 A1 | 4/2010 |

* cited by examiner

F I G . 11
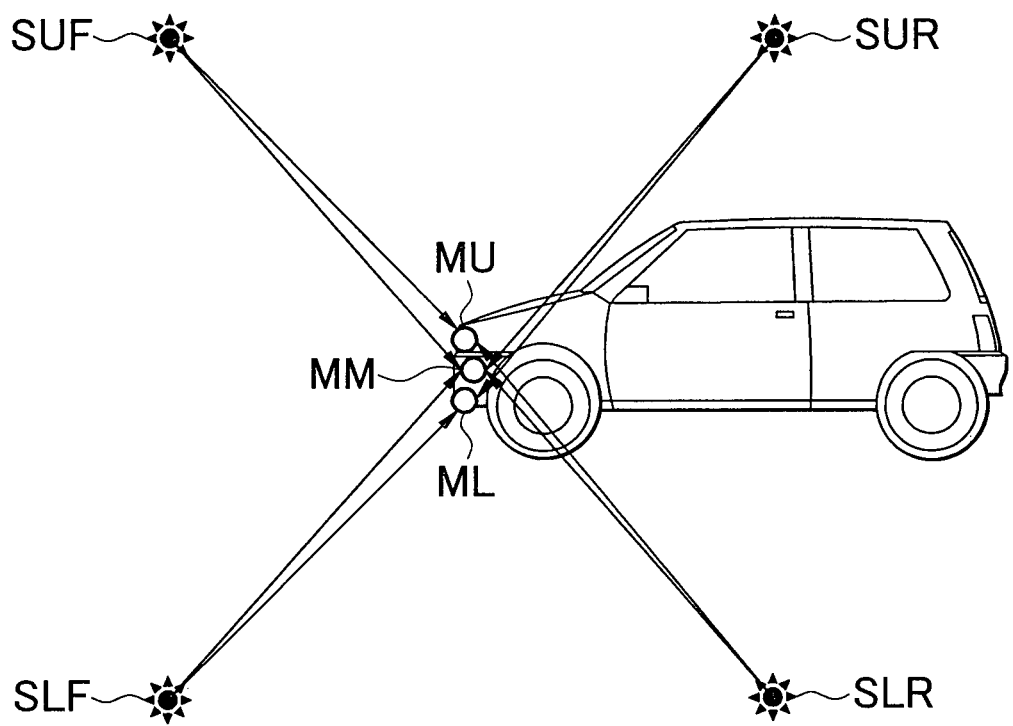

APPROACHING VEHICLE DETECTING SYSTEM AND APPROACHING VEHICLE DETECTING METHOD

BACKGROUND OF THE INVENTION

1. Field of the Invention

The invention relates to an approaching vehicle detecting system and approaching vehicle detecting method that detect an approaching vehicle on the basis of sounds collected by a plurality of sound collectors mounted on a host vehicle.

2. Description of Related Art

In an approaching vehicle detecting system, an ambient sound is collected by a plurality of sound collectors, and the moving direction of a sound source (particularly, the running sound of a vehicle) is identified on the basis of an arrival time interval between the collected sounds. In the system described in Japanese Utility Model Application Publication No. 5-92767 (JP 5-92767 U), frequency components in a low-frequency band and a high-frequency band each are removed by a band pass filter from electrical signals output from a plurality of microphones arranged at a predetermined interval to be converted to corrected electrical signals, power in a predetermined frequency band in which the feature of the running sound of a vehicle appears is calculated from the corrected electrical signals, it is determined that there is an approaching vehicle when the power level is higher than a predetermined value, and unnecessary noise components are removed from the corrected electrical signals to be converted to noise reduction signals, the cross correlation between the noise reduction signals of the plurality of microphones is computed, and the approaching direction of the approaching vehicle is computed from an arrival time interval at which the correlation is maximum.

In the above described approaching vehicle detecting system, in order to detect a vehicle that approaches in the transverse direction of a host vehicle, a plurality of microphones are arranged horizontally with respect to the host vehicle (parallel to a road surface). However, the inventors of the present application found a new challenge in process of development. That is, when a plurality of microphones are arranged horizontally in this way, not only a vehicle that is running on a road in the same plane as the host vehicle but also a vehicle that is running on a road vertically different in position from the host vehicle (for example, a road above the host vehicle (elevated road), a road below the host vehicle) is also detected as an approaching vehicle. That is, there is no difference in the arrival time interval between sounds collected by a plurality of horizontally arranged microphones between a sound source present in the same plane as the host vehicle and a sound source present above or below the host vehicle, so it is difficult to distinguish whether a sound source is in the same plane as the host vehicle. In this way, in the existing approaching vehicle detecting system, a sound source in a vertically different plane, which is unlikely to collide with the host vehicle, may also be detected as an approaching vehicle. As a result, an unnecessary alarm, or the like, about the detected approaching vehicle is issued, so the reliability of a safety system decreases.

SUMMARY OF THE INVENTION

The invention provides an approaching vehicle detecting system and approaching vehicle detecting method that highly accurately detect an approaching vehicle that runs on a road in the same plane as a host vehicle.

A first aspect of the invention relates to an approaching vehicle detecting system that detects an approaching vehicle on the basis of sounds collected by a plurality of sound collectors mounted on a host vehicle. The approaching vehicle detecting system includes: a transverse determination unit that determines whether a transverse moving direction of a sound source detected using the plurality of sound collectors is a direction approaching the host vehicle; and a vertical determination unit that determines whether a vertical position of the sound source detected using the plurality of sound collectors is in the same plane as that of the host vehicle, wherein, when the transverse determination unit determines that the transverse moving direction of the sound source is the direction approaching the host vehicle and the vertical determination unit determines that the vertical position of the sound source is in the same plane as that of the host vehicle, the sound source is detected as the approaching vehicle.

In the approaching vehicle detecting system, the plurality of sound collectors are used to detect a sound source (particularly, the running sound of a vehicle). In the approaching vehicle detecting system, the transverse determination unit determines whether the transverse moving direction of the sound source is the direction approaching the host vehicle, and the vertical determination unit determines whether the vertical position of the sound source is in the same plane as that of the host vehicle. Then, in the approaching vehicle detecting system, when it is determined that the transverse moving direction of the sound source is the direction approaching the host vehicle and it is determined that the vertical position of the sound source is in the same plane as that of the host vehicle, the sound source is detected as the vehicle approaching the host vehicle. Thus, even when the transverse moving direction of the sound source is the direction approaching the host vehicle, but when the vertical position of the sound source is not in the same plane as that of the host vehicle (above or below the host vehicle), the sound source (vehicle) is unlikely to collide with the host vehicle even when the sound source (vehicle) approaches the host vehicle in the transverse direction, so the sound source is not detected as the approaching vehicle to the host vehicle. In this way, in the approaching vehicle detecting system, by determining whether the vertical position of the sound source is in the same plane as that of the host vehicle in addition to the transverse moving direction of the sound source, it is possible to detect only an approaching vehicle in the same plane, which is likely to collide with the host vehicle, so the detection accuracy of an approaching vehicle improves.

In the approaching vehicle detecting system according to the first aspect of the invention, the vertical determination unit may determine that the vertical position of the sound source is in the same plane as that of the host vehicle when an arrival time interval between sounds respectively collected by the sound collectors arranged at different positions in the vertical direction of the host vehicle is smaller than or equal to a threshold.

In this approaching vehicle detecting system, the sound collectors are located at different positions in the vertical direction of the host vehicle, and a sound is collected by each of the sound collectors located at different positions in the vertical direction. When a sound source is present in the same plane as the host vehicle, the vertical position of the sound source is located at a position having substantially the same level as the sound collectors located at different positions in the vertical direction, so an arrival time interval of a sound from the sound source between the sound collectors located at different positions in the vertical direction is small. On the other hand, when a sound source is not present in the same plane as the host vehicle, the vertical position of the sound source is located at a position having a level significantly different from the level of the sound collectors located at different positions in the vertical direction, so an arrival time interval of a sound from the sound source between the sound collectors located at different positions in the vertical direction increases. Then, the vertical determination unit of the approaching vehicle detecting system determines whether the arrival time interval between sounds respectively collected by the sound collectors located at different positions in the vertical direction is smaller than or equal to the threshold, and, when the sound arrival time interval is smaller than or equal to the threshold, determines that the vertical position of the sound source is in the same plane as that of the host vehicle. In this way, in the approaching vehicle detecting system, by determining whether the sound arrival time interval between the sound collectors located at different positions in the vertical direction is smaller than or equal to the threshold, it is possible to simply and highly accurately determine whether the vertical position of the sound source is in the same plane as that of the host vehicle.

In the approaching vehicle detecting system according to the first aspect of the invention, the vertical determination unit may determine whether the vertical position of the sound source is in the same plane as that of the host vehicle on the basis of a variation in an arrival time interval between sounds respectively collected by the sound collectors arranged at different positions in the vertical direction of the host vehicle and different positions in the transverse direction of the host vehicle.

In this approaching vehicle detecting system, the sound collectors are arranged at different positions in the vertical direction of the host vehicle and different positions in the transverse direction of the host vehicle, and a sound is collected by each of the sound collectors located at different positions in the vertical direction and different positions in the transverse direction. When a sound source is present in the same plane as the host vehicle, as the sound source approaches the host vehicle and then moves away from the host vehicle in the transverse direction of the host vehicle, the sound collector that a sound from the sound source reaches first changes in the middle (irrespective of the vertical positions of the sound collectors, it changes from the left sound collector to the right sound collector when the sound source moves from the left side of the host vehicle to the right side of the host vehicle, and it changes from the right sound collector to the left sound collector when the sound source moves from the right side of the host vehicle to the left side of the host vehicle), so the arrival time interval of a sound from the sound source between the sound collectors varies from a negative value to a positive value or varies from a positive value to a negative value. On the other hand, when a sound source is not present in the same plane as the host vehicle, even when the sound source approaches the host vehicle and then moves away from the host vehicle in the transverse direction of the host vehicle, the sound collector that a sound from the sound source reaches first does not change in the middle (irrespective of the transverse positions of the sound collectors, it always reaches the upper sound collector first when the sound source is present above the host vehicle, and it always reaches the lower sound collector first when the sound source is present below the host vehicle), so the arrival time interval of a sound from the sound source between the sound collectors varies in a positive value or varies in a negative value. Then, the vertical determination unit of the approaching vehicle detecting system determines whether the vertical position of the sound source is in the same plane as that of the host vehicle on the basis of a variation in the arrival time interval between the sounds respectively collected by the sound collectors located at different positions in the vertical direction and different positions in the transverse direction. In this way, in the approaching vehicle detecting system, by carrying out determination on the basis of the variation in the sound arrival time interval between the sound collectors located at different positions in the vertical direction and different positions in the transverse direction, it is possible to simply and highly accurately determine whether the vertical position of the sound source is in the same plane as that of the host vehicle.

In the approaching vehicle detecting system according to the first aspect of the invention, the plurality of sound collectors may include at least one pair of sound collectors located at different positions in the vertical direction of the host vehicle and at least one pair of sound collectors arranged at different positions in the transverse direction of the host vehicle.

In this approaching vehicle detecting system, the at least one pair of sound collectors are arranged at different positions in the vertical direction of the host vehicle, and a sound is collected by each of the at least one pair of sound collectors located at different positions in the vertical direction. Then, the vertical determination unit of the approaching vehicle detecting system is able to determine whether the vertical position of the sound source is in the same plane as the host vehicle by using the sound collected by each of the pair of sound collectors located at different positions in the vertical direction. In addition, in the approaching vehicle detecting system, the at least one pair of sound collectors are located at different positions in the transverse direction of the host vehicle, and a sound is collected by each of the at least one pair of sound collectors located at different positions in the transverse direction. Then, the transverse determination unit of the approaching vehicle detecting system is able to determine whether the transverse moving direction of the sound source is the direction approaching the host vehicle by using the sound collected by each of the at least one pair of sound collectors located at different positions in the transverse direction.

Note that, when the plurality of sound collectors include the at least one pair of sound collectors located at different positions in the vertical direction and the at least one pair of sound collectors located at different positions in the transverse direction, the at least one pair of sound collectors located at different positions in the vertical direction and the at least one pair of sound collectors located at different positions in the transverse direction may be formed of different sound collectors, the at least one pair of sound collectors located at different positions in the vertical direction and the at least one pair of sound collectors located at different positions in the transverse direction may be formed of partially shared sound collectors or the at least one pair of sound collectors located at different positions in the vertical direction and the at least one pair of sound collectors located at different positions in the transverse direction may be formed of entirely shared sound collectors.

In the approaching vehicle detecting system according to the first aspect of the invention, the at least one pair of upper sound collector and lower sound collector located at different positions in the vertical direction may be arranged at different positions in a longitudinal direction of the host vehicle.

In this approaching vehicle detecting system, the at least one pair of upper sound collector and lower sound collector arranged at different positions in the vertical direction of the host vehicle are arranged at different positions in the longitudinal direction of the host vehicle. For example, the case where the upper sound collector is arranged on the front side of the lower sound collector in the host vehicle will be discussed. When a sound source is present above and in front of the host vehicle, in comparison with the case where the at least one pair of sound collectors are arranged at the same longitudinal position, a sound from the sound source reaches the upper front sound collector earlier than the lower rear sound collector, so the sound arrival time interval increases. In this way, in the approaching vehicle detecting system, by arranging the at least one pair of sound collectors, located at different positions in the vertical direction, at different positions in the longitudinal direction, the sound arrival time interval between the at least one pair of sound collectors increases depending on the position of a sound source that is not present in the same plane as the host vehicle, so the capability of distinguishing sound sources in the vertical direction improves. As a result, the distinguishing capability may be ensured without arranging the at least one pair of sound collectors with a large vertical space, so the design flexibility may be ensured.

Note that, when the number of the pairs of sound collectors located at different positions in the vertical direction is one, the sound arrival time interval from a sound source above and in front of the host vehicle and the sound arrival time interval from a sound source below and behind the host vehicle increase when the upper sound collector is arranged on the front side of the lower sound collector; whereas the sound arrival time interval from a sound source above and behind the host vehicle and the sound arrival time interval from a sound source below and in front of the host vehicle increase when the lower sound collector is arranged on the front side of the upper sound collector. In addition, when the number of the pairs of sound collectors located at different positions in the vertical direction is two, both the above two arrangements may be implemented, so the sound arrival time interval from a sound source at any position, which is not present in the same plane as the host vehicle, may be increased.

A second aspect of the invention relates to an approaching vehicle detecting method that detects an approaching vehicle on the basis of sounds collected by a plurality of sound collectors mounted on a host vehicle. The approaching vehicle detecting method includes: determining whether a transverse moving direction of a sound source detected using the plurality of sound collectors is a direction approaching the host vehicle; determining whether a vertical position of the sound source detected using the plurality of sound collectors is in the same plane as the host vehicle; and, when it is determined that the transverse moving direction of the sound source is the direction approaching the host vehicle and it is determined that the vertical position of the sound source is in the same plane as the host vehicle, detecting the sound source as the approaching vehicle. The approaching vehicle detecting method has similar operation and similar advantageous effects to those of the approaching vehicle detecting system.

According to the aspects of the invention, by determining whether the vertical position of the sound source is in the same plane as the host vehicle in addition to the transverse moving direction of the sound source, it is possible to detect only an approaching vehicle in the same plane, which is likely to collide with the host vehicle, so the detection accuracy of an approaching vehicle improves.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2A and FIG. 2B are views that illustrate a sound arrival time interval on the basis of arrangement of a pair of sound collectors, in which FIG. 2A shows the case where the pair of sound collectors are arranged in the vertical direction and FIG. 2B shows the case where the pair of sound collectors are arranged in the transverse direction;

FIG. 3A to FIG. 3D are arrangement views of sound collectors in a sound collector array according to the first embodiment, in which FIG. 3A shows an example in the case of three sound collectors, FIG. 3B shows another example in the case of three sound collectors, FIG. 3C shows an example in the case of four sound collectors and FIG. 3D shows an example in the case where sound collectors are shared with another system;

FIG. 6A and FIG. 6B are arrangement views of sound collectors of a sound collector array according to the second embodiment, in which FIG. 6A shows the case where a transverse space is wide and FIG. 6B shows the case where a vertical space is wide;

FIG. 7A to FIG. 7C are views that illustrate an approaching vehicle detecting method according to the second embodiment, in which FIG. 7A is a view that shows the moving direction of a sound source, FIG. 7B is a view that shows a temporal difference in sound arrival time interval in the case where a sound source is present in the same plane as a host vehicle and FIG. 7C is a view that shows a temporal variation in sound arrival time interval in the case where a sound source is not present in the same plane as the host vehicle;

FIG. 10A and FIG. 10B are arrangement views of a pair of upper and lower sound collectors in a sound collector array, in which FIG. 10A shows the case where the upper and lower sound collectors are located at different positions in the longitudinal direction and FIG. 10B shows the case where the upper and lower sound collectors are located at the same position in the longitudinal direction; and FIG. 11 is an arrangement view of two pairs of upper and lower sound collectors in a sound collector array.

DETAILED DESCRIPTION OF EMBODIMENTS

Figure 1:
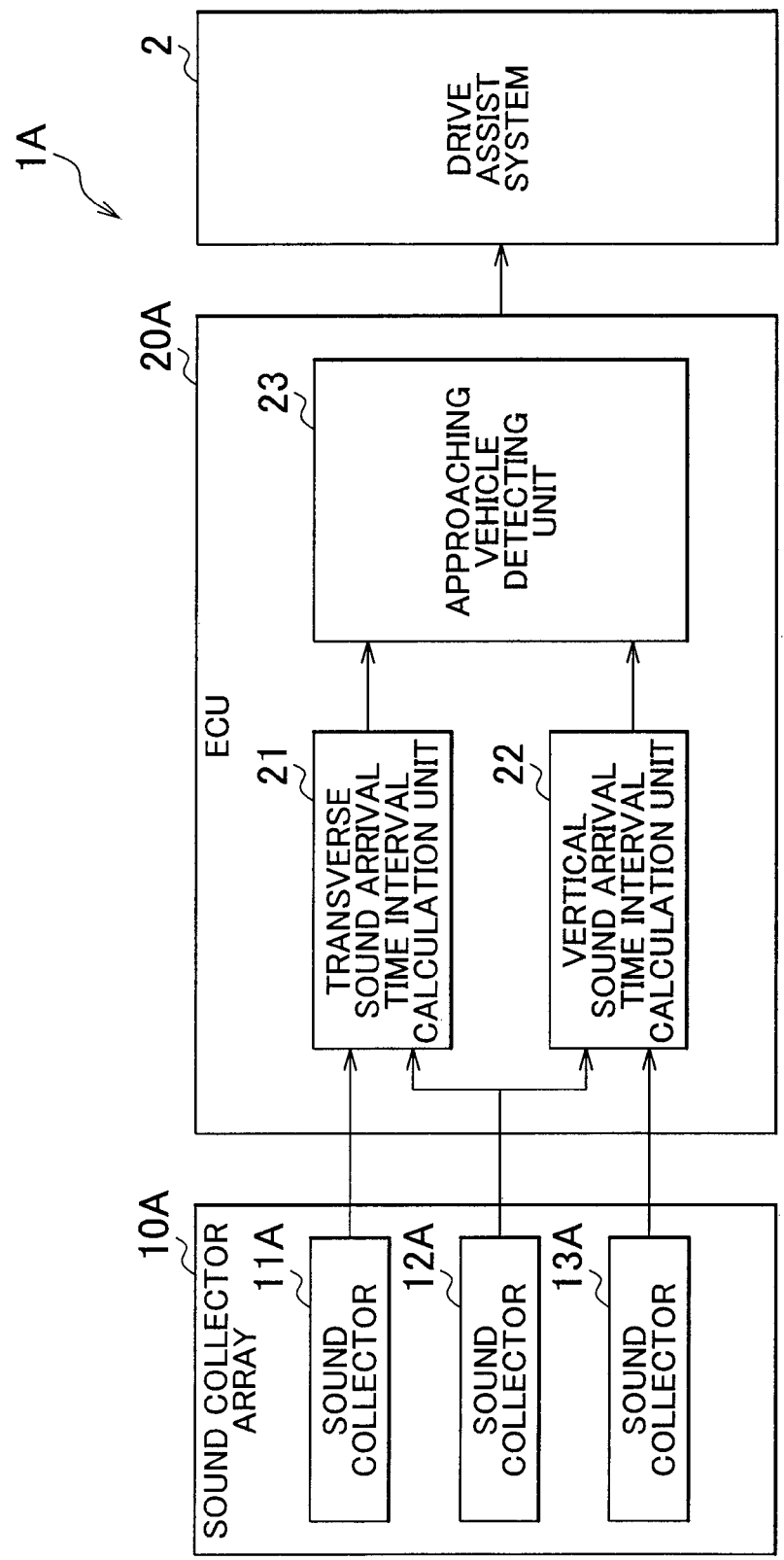
FIG. 1 is a configuration diagram of an approaching vehicle detecting system according to a first embodiment.

Hereinafter, embodiments of an approaching vehicle detecting system and approaching vehicle detecting method according to the aspect of the invention will be described with reference to the accompanying drawings. Note that in the drawings, like reference numerals denote the same or corresponding elements in the drawings, and the overlap description is omitted.

In the present embodiments, the aspect of the invention is applied to an approaching vehicle detecting system equipped for a vehicle. The approaching vehicle detecting system according to the present embodiments detects a vehicle that approaches a host vehicle (that is, identifies the moving direction of a sound source, that is, the running sound of a surrounding vehicle) on the basis of sounds respectively collected by a plurality of (two or more) sound collectors (microphones), and then provides information about the approaching vehicle to a drive assist system. In the present embodiments, a first embodiment in the case where the number of sound collectors is three or more and a second embodiment in the case where the number of sound collectors is two are described, and various arrangements of the plurality of sound collectors are described.

Note that the running sound of a vehicle is mostly formed of road noise (frictional noise between a tire surface and a road surface) and pattern noise (turbulence (compression or release) of air in a tire groove. The range of the frequency component of the running sound of the vehicle may be measured by an experiment, or the like, in advance.

Figure 2A:
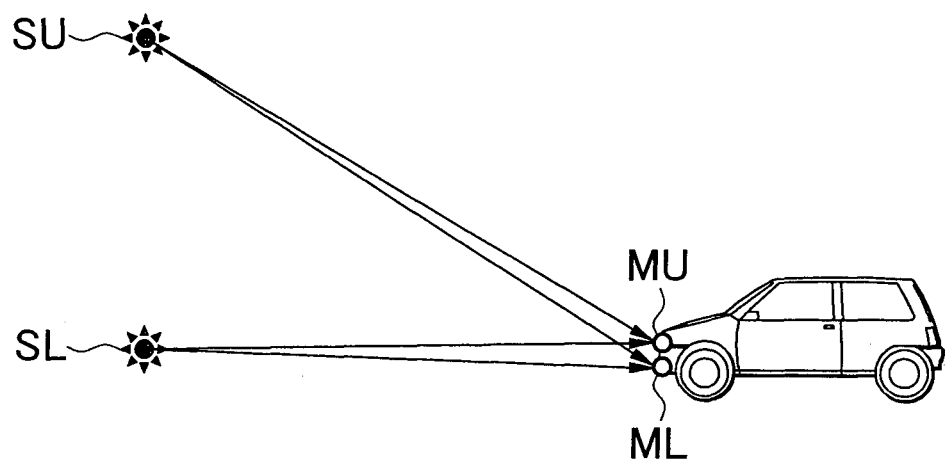
Figure 2B:
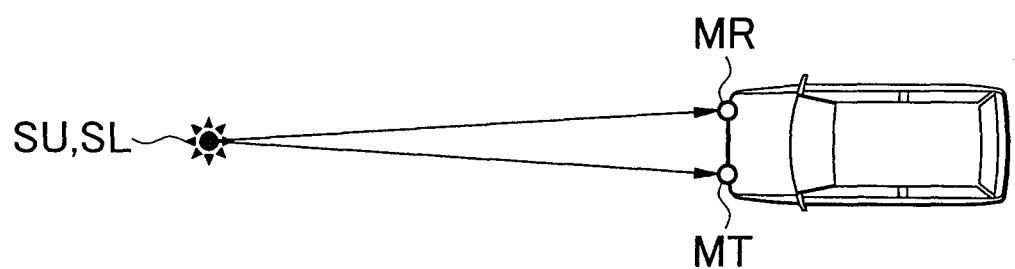
Figure 3A:
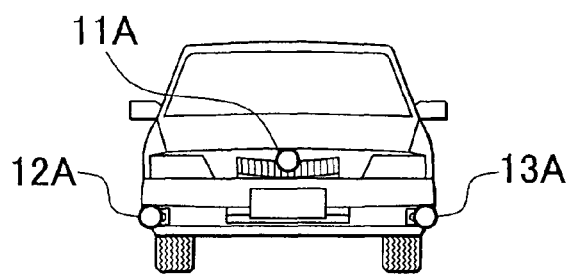
Figure 3B:
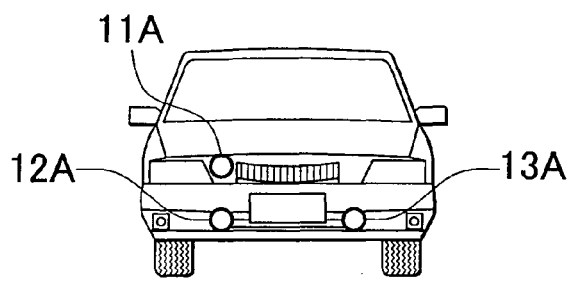
Figure 3C:
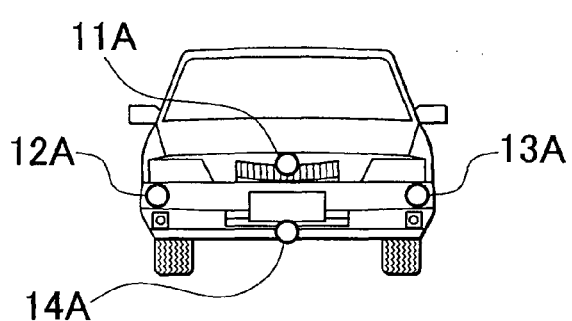
Figure 3D:
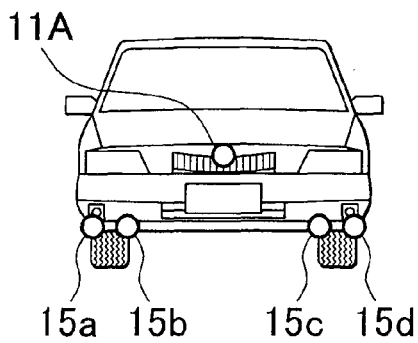

The approaching vehicle detecting system 1 according to the first embodiment will be described with reference to FIG. 1 to FIG. 3D. FIG. 1 is a configuration diagram of the approaching vehicle detecting system according to the first embodiment. FIG. 2A and FIG. 2B are views that illustrate a sound arrival time interval on the basis of arrangement of a pair of sound collectors, in which FIG. 2A shows the case where the pair of sound collectors are arranged in the vertical direction and FIG. 2B shows the case where the pair of sound collectors are arranged in the transverse direction. FIG. 3A to FIG. 3D are arrangement views of sound collectors in a sound collector array according to the first embodiment, in which FIG. 3A shows an example in the case of three sound collectors, FIG. 3B shows another example in the case of three sound collectors, FIG. 3C shows an example in the case of four sound collectors and FIG. 3D shows an example in the case where sound collectors are shared with another system.

The approaching vehicle detecting system 1A uses three or more sound collectors to constitute a pair of sound collectors located at different positions in the transverse direction (horizontal direction) of the host vehicle and a pair of sound collectors located at different positions in the vertical direction. Then, the approaching vehicle detecting system 1A determines whether a sound source is, approaching in the transverse direction on the basis of a sound arrival time interval between the pair of sound collectors located at different positions in the transverse direction and determines whether the vertical position of the sound source is in the same plane as the host vehicle on the basis of a sound arrival time interval between the pair of sound collectors located at different positions in the vertical direction, and then detects the sound source that approaches in the transverse direction in the same plane as the host vehicle as an approaching vehicle.

The approaching vehicle detecting system 1A includes a sound collector array 10A (sound collectors 11A, 12A and 13A) and an electronic control unit (ECU) 20A (a transverse sound arrival time interval calculation unit 21, a vertical sound arrival time interval calculation unit 22 and an approaching vehicle detecting unit 23). In the first embodiment, the process executed in the approaching vehicle detecting unit 23 of the ECU 20A corresponds to a transverse determination unit and a vertical determination unit according to the aspect of the invention. Note that the configuration diagram of FIG. 1 shows the case of three sound collectors.

The sound arrival time interval between a pair of sound collectors located at different positions in the vertical direction and the sound arrival time interval between a pair of sound collectors located at different positions in the transverse direction will be described with reference to FIG. 2A and FIG. 2B. FIG. 2A shows a pair of sound collectors formed of an upper sound collector MU and a lower sound collector ML located at different positions in the vertical direction, and shows a sound source SL present in the same plane right in front of the host vehicle and a sound source SU present above. When a sound from the sound source SL is collected by the sound collector MU and the sound collector ML, the distance between the sound collector MU and the sound source SL is substantially equal to the distance between the sound collector ML and the sound source SL because the sound collector MU and the sound collector ML are located at the position having substantially the same level as the sound source SL, a sound from the sound source SL reaches the sound collector MU and the sound collector ML in substantially the same period of time, so the sound arrival time interval between the pair of sound collectors is extremely small. On the other hand, when a sound from the sound source SU is collected by the sound collector MU and the sound collector ML, the distance between the sound collector MU and the sound source SU is shorter than the distance between the sound collector ML and the sound source SU because the sound collector MU and the sound collector ML are located at significantly different levels from the sound source SL, so a sound from the sound source SL reaches the sound collector MU earlier than the sound collector ML, and the sound arrival time interval between the pair of sound collectors is large. This also applies to the case where a sound source is present below. Thus, by utilizing the pair of sound collectors located at different positions in the vertical direction, it is possible to distinguish whether the sound source is present in the same plane as the host vehicle or the sound source is present above or below the host vehicle.

FIG. 2B shows a pair of sound collectors formed of a right sound collector MR and a left sound collector MT located at different positions in the transverse direction, and shows the sound source SL present in the same plane right in front of the host vehicle and the sound source SU present above. When a sound from the sound source SL is collected by the sound collector MU and the sound collector ML, the distance between the sound collector MR and the sound source SL is substantially equal to the distance between the sound collector MT and the sound source SL, so a sound from the sound source SL reaches the sound collector MR and the sound collector MT in substantially the same period of time, and the sound arrival time interval between the pair of sound collectors is significantly small. In addition, when a sound from the sound source SU is collected by the sound collector MR and the sound collector MT as well, because the distance between the sound collector MR and the sound source SU is substantially equal to the distance between the sound collector MT and the sound source SU, so a sound from the sound source SU reaches the sound collector MR and the sound collector MT in substantially the same period of time, and the sound arrival time interval between the pair of sound collectors is also significantly small.

As can be understood from the above relationship, the pair of sound collectors located at different positions in the vertical direction are utilized to thereby make it possible to distinguish whether the sound source is located in the same plane or the sound source is located above or below. In addition, the pair of sound collectors located at different positions in the transverse direction are utilized to thereby make it possible to recognize the sound source that approaches in the transverse direction as in the case of the existing art.

The sound collector array 10A has three or more sound collectors 11A, . . . . In the sound collector array 10A, the three or more sound collectors 11A, . . . are used to constitute the pair of sound collectors located at different positions in the transverse direction and the pair of sound collectors located at different positions in the vertical direction.

An example of the sound collector array 10A will be described with reference to FIG. 3A to FIG. 3D. In the case of FIG. 3A, the three sound collectors 11A, 12A and 13A are arranged in a triangular shape. The sound collector 12A and the sound collector 13A are arranged in the transverse direction (vehicle widthwise direction) at the positions having the same level (lower positions) as the front end portion of the host vehicle, the sound collector 12A is arranged at the right side of the host vehicle, and the sound collector 13A is arranged at the left side of the host vehicle. The sound collector 11A is arranged at the center of the host vehicle in the transverse direction at the level higher than those of the sound collectors 12A and 13A arranged at the front end portion of the host vehicle. In the case of this arrangement, a pair of sound collectors formed of the sound collector 12A and the sound collector 13A, the pair of sound collectors formed of the sound collector 12A and the sound collector 11A and the pair of sound collectors formed of the sound collector 13A and the sound collector 11A each may be configured as the pair of sound collectors located at different positions in the transverse direction, and at least one pair of these three pairs is used. In addition, a pair of sound collectors formed of the sound collector 11A and the sound collector 12A and a pair of sound collectors formed of the sound collector 11A and the sound collector 13A each may be configured as the pair of sound collectors located at different positions in the vertical direction, and at least one pair of these two pairs is used. In this case, the three sound collectors 11, 12A and 13A are shared between the pair of transversely arranged sound collectors and the pair of vertically arranged sound collectors.

In the case of FIG. 3B, the three sound collectors 11A, 12A and 13A are arranged in an L shape. The sound collector 12A and the sound collector 13A are arranged in the transverse direction at the positions having the same level (lower positions) as the front end portion of the host vehicle, the sound collector 12A is arranged at the right side of the host vehicle, and the sound collector 13A is arranged at the left side of the host vehicle. The sound collector 11A is arranged at the same position as the sound collector 12A in the transverse direction of the host vehicle at the level higher than those of the sound collectors 12A and 13A arranged at the front end portion of the host vehicle. In the case of this arrangement, a pair of sound collectors formed of the sound collector 12A and the sound collector 13A are used as the pair of sound collectors located at different positions in the transverse direction. In addition, a pair of sound collectors formed of the sound collector 11A and the sound collector 12A are used as the pair of sound collectors located at different positions in the vertical direction. In this case, the sound collector 12A is shared between the pair of transversely arranged sound collectors and the pair of vertically arranged sound collectors.

In the case of FIG. 3C, the four sound collectors 11A, 12A, 13A and 14A are arranged in a cross shape. The sound collector 12A and the sound collector 13A are arranged in the transverse direction at the positions (intermediate positions) having the same level as the front end portion of the host vehicle, the sound collector 12A is arranged at the right side of the host vehicle, and the sound collector 13A is arranged at the left side of the host vehicle. The sound collector 11A and the sound collector 14A are arranged at the center position in the transverse direction at the front end portion of the host vehicle, the sound collector 11A is arranged at the position having the level higher than those of the sound collectors 12A and 13A, and the sound collector 14A is arranged at the position having the level lower than those of the sound collectors 12A and 13A. In the case of this arrangement, a pair of sound collectors formed of the sound collector 12A and the sound collector 13A are used as the pair of sound collectors located at different positions in the transverse direction. In addition, a pair of sound collectors formed of the sound collector 11A and the sound collector 14A are used as the pair of sound collectors located at different positions in the vertical direction. In this case, the pair of transversely arranged sound collectors and the pair of vertically arranged sound collectors are independent of each other.

The sound collector may be shared with components utilized in another system in consideration of cost, design, and the like. For example, in the case of a clearance sonar, it is applicable that the sonar usually utilizes an ultrasonic frequency band but the sonar is configured such that the frequency band is expanded to a range that sufficiently includes the frequency band of the running sound of a vehicle and then the sound collector may be shared with such expanded clearance sonar. FIG. 3D shows the case where clearance sonars 15a, 15b, 15c and 15d of which the frequency band is expanded are utilized, and shows the case where the sound collector 11A and the clearance sonars 15a, 15b, 15c and 15d are arranged in a substantially triangular shape. The clearance sonars 15a, 15b, 15c and 15d are arranged in the transverse direction at the positions (lower positions) having the same level as the front end portion of the host vehicle, the clearance sonars 15a and 15b are arranged at the right side, and the clearance sonars 15c and 15d are arranged at the left side. The sound collector 11A is arranged at the center in the transverse direction of the host vehicle at the position having the level higher than those of the clearance sonars 15a, 15b, 15c and 15d at the front end portion of the host vehicle. In the case of this arrangement, for example, a pair of the clearance sonar 15a and the clearance sonar 15d, a pair of the clearance sonar 15b and the clearance sonar 15c, or the like, are used as the pair of sound collectors located at different positions in the transverse direction. In addition, for example, a pair of the sound collector 11A and the clearance sonar 15b, a pair of the sound collector 11A and the clearance sonar 15c, or the like, are used as the pair of sound collectors located at different positions in the vertical direction.

The detection capability for a sound in the transverse direction depends on the space between the pair of sound collectors located at different positions in the transverse direction, and the maximum detectable distance (spatial resolution) in the transverse direction increases as the space increases. In addition, the detection capability for a sound in the vertical direction depends on the space between the pair of sound collectors located at different positions in the vertical direction, and the vertical distinguishing capability (the capability of distinguishing whether a sound source is above or below or in the same plane against noise) or the maximum detectable distance increases as the space increases.

Each of the sound collectors 11A, . . . is a nondirectional sound collector, and collects an ambient sound outside the vehicle. Each of the sound collectors 11A, . . . is an acoustic-electric converter, converts a collected sound to an electric signal, and transmits the electric signal to the ECU 20A.

The ECU 20A is an electronic control unit formed of a central processing unit (CPU), a read only memory (ROM), a random access memory (RAM), and the like, and comprehensively controls the approaching vehicle detecting system 1A. In the ECU 20A, an approaching vehicle detecting application stored in the ROM is loaded onto the RAM and is executed by the CPU to thereby implement the transverse sound arrival time interval calculation unit 21, the vertical sound arrival time interval calculation unit 22 and the approaching vehicle detecting unit 23. Then, in the ECU 20A, electric signals are respectively input from the three or more sound collectors 11A, ..., and the electric signals are used to execute processings in the processing units 21, 22 and 23 at set time intervals.

The transverse sound arrival time interval calculation unit 21 calculates a sound arrival time interval from the cross correlation between the electric signals of the pair of sound collectors located at different positions in the transverse direction. The vertical sound arrival time interval calculation unit 22 calculates a sound arrival time interval from the cross correlation between the electric signals of the pair of sound collectors located at different positions in the vertical direction. At this time, it is desirable that sound arrival time intervals are calculated for only the sound source having a frequency component corresponding to the running sound of a vehicle.

A method of calculating a sound arrival time interval is, for example, such that a signal in a set period of time is extracted from the electric signal of one of the sound collectors and a signal in the set period of time is extracted from the electric signal of the other one of the sound collectors, the cross correlation value is sequentially calculated while shifting the extracting period of time and a time interval at which the cross correlation value is larger than or equal to a threshold (that is, the waveforms of the two electric signals of which the extracting period of time is shifted are similar to each other) is determined as a sound arrival time interval. Note that the calculated sound arrival time interval may be a positive value or may be a negative value. The calculated sound arrival time interval becomes a positive value or a negative value depending on the arrangement of the pair of sound collectors, a sound arrival time interval calculated with reference to which one of the pair of sound collectors and the position of a sound source.

The approaching vehicle detecting unit 23 determines whether the absolute value of the sound arrival time interval between the pair of sound collectors located at different positions in the transverse direction is smaller than a threshold (for transverse approach determination). The threshold (for transverse approach determination) is a threshold for determining whether a sound source is approaching on the basis of the sound arrival time interval between the pair of transversely arranged sound collectors, and is set in advance by an experiment, or the like. The approaching vehicle detecting unit 23 determines that the sound source is approaching in the transverse direction when the absolute value of the sound arrival time interval between the pair of transversely arranged sound collectors reduces and the absolute value of the sound arrival time interval is smaller than the threshold (for transverse approach determination). On the other hand, the approaching vehicle detecting unit 23 determines that the sound source is not approaching in the transverse direction and determines that there is no approaching vehicle when the absolute value of the sound arrival time interval between the pair of transversely arranged sound collectors is larger than or equal to the threshold (for transverse approach determination). In this case, when the absolute value of the sound arrival time interval is small but the absolute value of the sound arrival time interval is larger than or equal to the threshold (for transverse approach determination), the sound source is approaching in the transverse direction but the sound source is not close to the host vehicle such that a collision is likely to occur. In addition, the approaching vehicle detecting unit 23 determines that the sound source is remote from the host vehicle in the transverse direction when the absolute value of the sound arrival time interval between the pair of transversely arranged sound collectors becomes smaller than the threshold (for transverse approach determination) and then the absolute value of the sound arrival time interval increases.

When it is determined that the sound source is approaching in the transverse direction, the approaching vehicle detecting unit 23 determines whether the absolute value of the sound arrival time interval between the pair of sound collectors located at different positions in the vertical direction is smaller than a threshold (for vertical approach determination). The threshold (for vertical approach determination) is a threshold for determining whether the sound source is in the same plane on the basis of the sound arrival time interval between the pair of vertically arranged sound collectors, and is set in advance by an experiment, or the like. The approaching vehicle detecting unit 23 determines that the sound source is in the same plane and determines the sound source as an approaching vehicle in the same plane when the absolute value of the sound arrival time interval between the pair of vertically arranged sound collectors is smaller than the threshold (for vertical approach determination). Only in this case, the sound source is detected as an approaching vehicle to the host vehicle. On the other hand, the approaching vehicle detecting unit 23 determines that the sound source is not in the same plane and determine that the sound source is an approaching vehicle above the host vehicle (on an elevated road) or below the host vehicle when the absolute value of the sound arrival time interval between the pair of vertically arranged sound collectors is larger than or equal to the threshold (for vertical approach determination).

Then, the ECU 20A generates approaching vehicle information on the basis of the results determined by the approaching vehicle detecting unit 23, and transmits the approaching vehicle information to a drive assist system 2. The approaching vehicle information is, for example, information about whether there is an approaching vehicle and, when there is an approaching vehicle, the approaching direction and relative distance to the host vehicle. Note that the case where there is an approaching vehicle is the case where there is a sound source (vehicle) that approaches in the transverse direction in the same plane as the host vehicle.

The drive assist system 2 is a system that assists a driver in various driving operations. Particularly, the drive assist system 2 carries out drive assist in association with an approaching vehicle at set time intervals as the drive assist system 2 receives approaching vehicle information from the approaching vehicle detecting system 1A. For example, when there is a vehicle that approaches the host vehicle, it is determined whether the approaching vehicle is likely to collide with the host vehicle, and, when it is determined that the approaching vehicle is likely to collide with the host vehicle, an alarm is issued to the driver or information about the approaching vehicle is provided to the driver, and, furthermore, vehicle control, such as automatic braking, is carried out when the likelihood of the collision increases.

Figure 4:
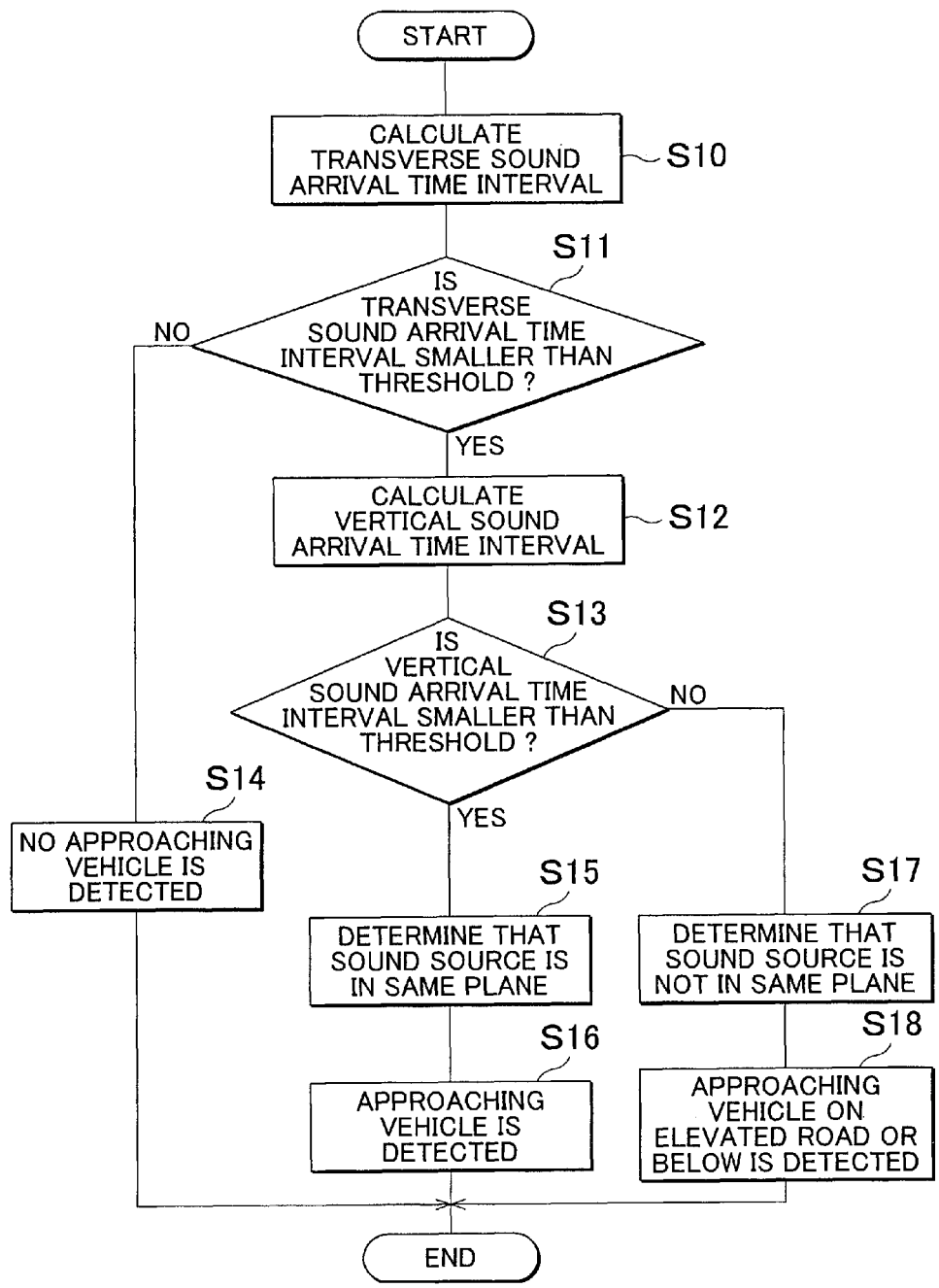
FIG. 4 is a flow chart that shows the flow of processes executed by an ECU of the approaching vehicle detecting system according to the first embodiment.

Next, the operation of the approaching vehicle detecting system 1A will be described with reference to FIG. 1 to FIG. 3D. Particularly, the processes executed in the ECU 20A will be described with reference to the flow chart shown in FIG. 4. FIG. 4 is a flow chart that shows the flow of processes executed by the ECU of the approaching vehicle detecting system according to the first embodiment. Here, the case where the three sound collectors 11A, 12A and 13A are provided, the pair of sound collectors located at different positions in the transverse direction are formed of the sound collector 12A and the sound collector 13A and the pair of sound collectors located at different positions in the vertical direction are formed of the sound collector 11A and the sound collector 12A will be described.

Each of the sound collectors 11A, 12A and 13A collects an ambient sound outside the vehicle, converts the collected sound to an electric signal and transmits the electric signal to the ECU 20A. The ECU 20A inputs the electric signals.

The ECU 20A uses the electric signal of the sound collector 12A and the electric signal of the sound collector 13A to calculate a transverse sound arrival time interval at set time intervals (S10).

Then, the ECU 20A determines whether the absolute value of the transverse sound arrival time interval is smaller than the threshold (for transverse approach determination) (S11). When it is determined in S11 that the absolute value of the transverse sound arrival time interval is larger than or equal to the threshold (for transverse approach determination), the ECU 20A determines that no approaching vehicle is detected (S14).

When it is determined in S11 that the absolute value of the transverse sound arrival time interval is smaller than the threshold (for transverse approach determination), it is determined that the sound source approaches in the transverse direction of the host vehicle, and the ECU 20A uses the electric signal of the sound collector 11A and the electric signal of the sound collector 12A to calculate a vertical sound arrival time interval (S12). Then, the ECU 20A determines whether the absolute value of the vertical sound arrival time interval is smaller than the threshold (for vertical approach determination) (S13). When it is determined in S13 that the absolute value of the vertical sound arrival time interval is smaller than the threshold (for vertical approach determination), the ECU 20A determines that the sound source that approaches in the transverse direction of the host vehicle is in the same plane as the host vehicle (S15), and detects the sound source as the approaching vehicle to the host vehicle (516). When it is determined in S13 that the absolute value of the vertical sound arrival time interval is larger than or equal to the threshold (for vertical approach determination), the ECU 20A determines that the sound source that approaches in the transverse direction of the host vehicle is not in the same plane as the host vehicle (S17), and determines the sound source as the approaching vehicle above the host vehicle (on an elevated road) or below the host vehicle.

The ECU 20A generates approaching vehicle information on the basis of the above described determination results, and transmits the approaching vehicle information to the drive assist system 2. The ECU 20A repeats the above described processes.

With the approaching vehicle detecting system 1A, the three or more sound collectors are used to form the pair of transversely arranged sound collectors and the pair of vertically arranged sound collectors, the sound arrival time interval between the pair of transversely arranged sound collectors is utilized to determine whether a sound source is approaching in the transverse direction and the sound arrival time interval between the pair of vertically arranged sound collectors is utilized to determine whether the sound source is in the same plane as the host vehicle. By so doing, it is possible to detect only an approaching vehicle in the same plane, which is likely to collide with the host vehicle, so the detection accuracy of an approaching vehicle improves. As a result, it is possible to suppress an unnecessary alarm output, or the like, against an approaching vehicle that is not in the same plane as the host vehicle, so the reliability of drive assist improves.

Figure 5:
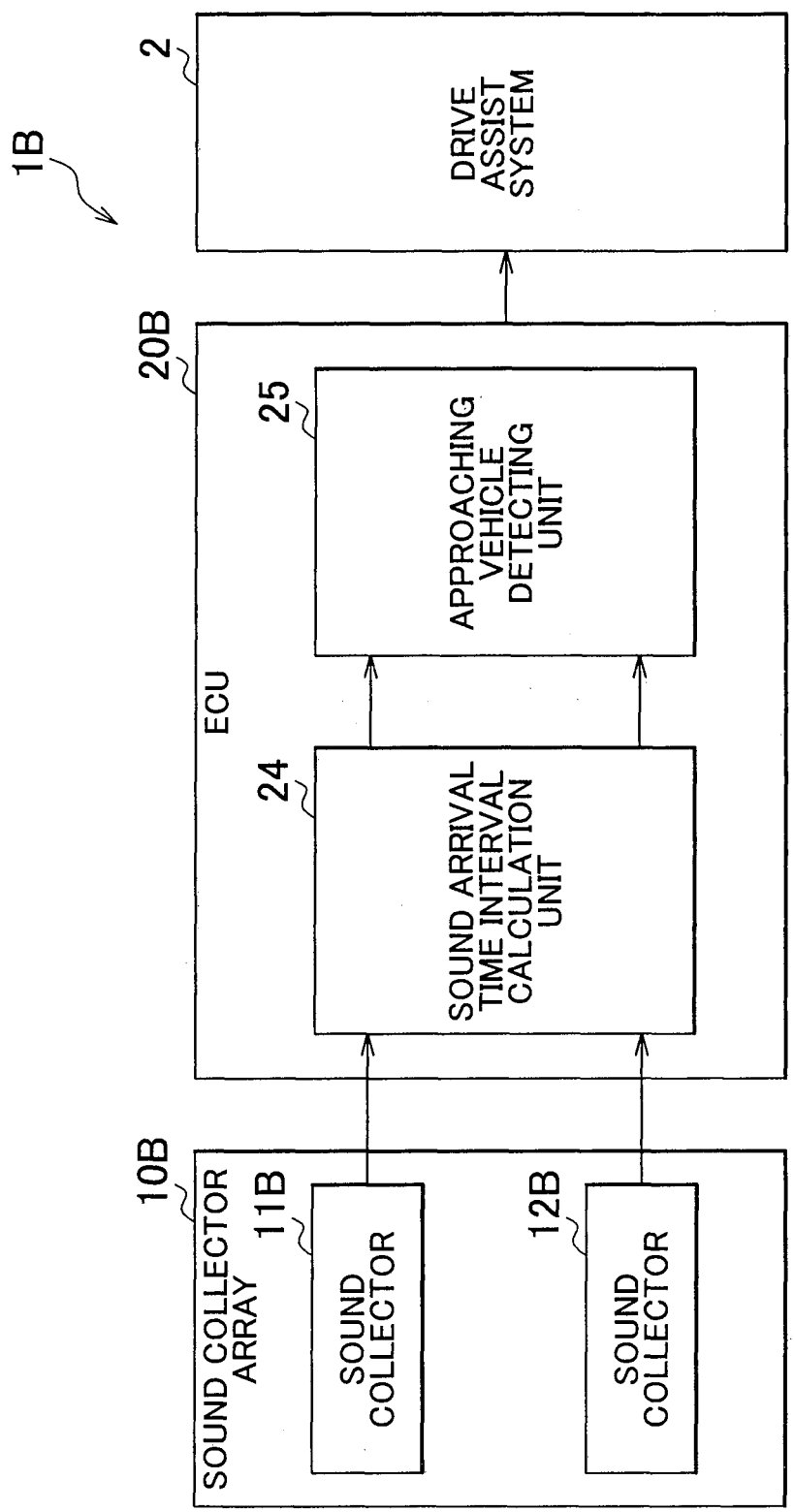
FIG. 5 is a configuration diagram of an approaching vehicle detecting system according to a second embodiment.
Figure 6A:
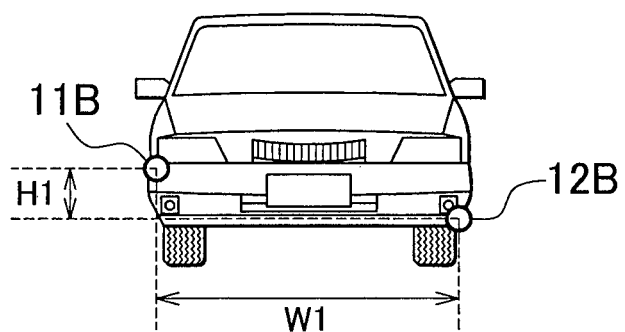
Figure 6B:
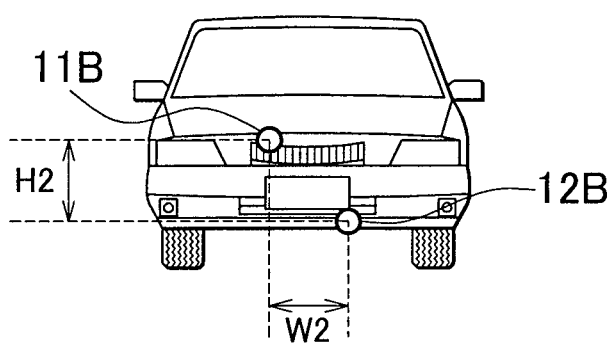
Figure 7A:
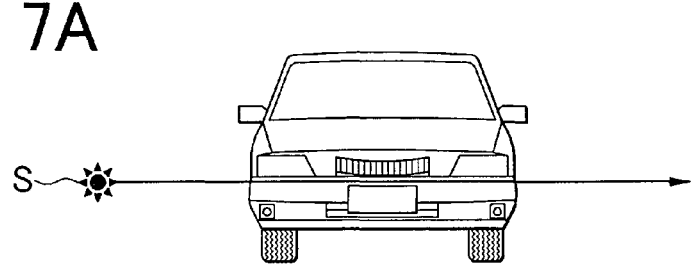
Figure 7B:
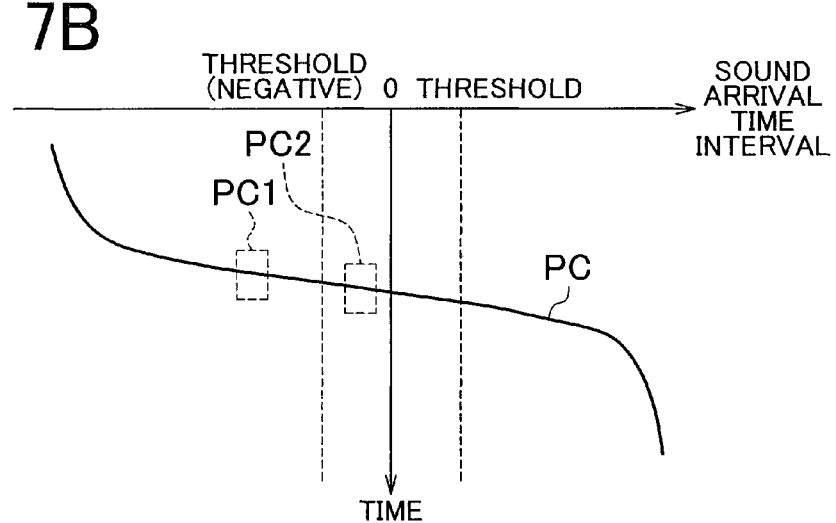
Figure 7C:
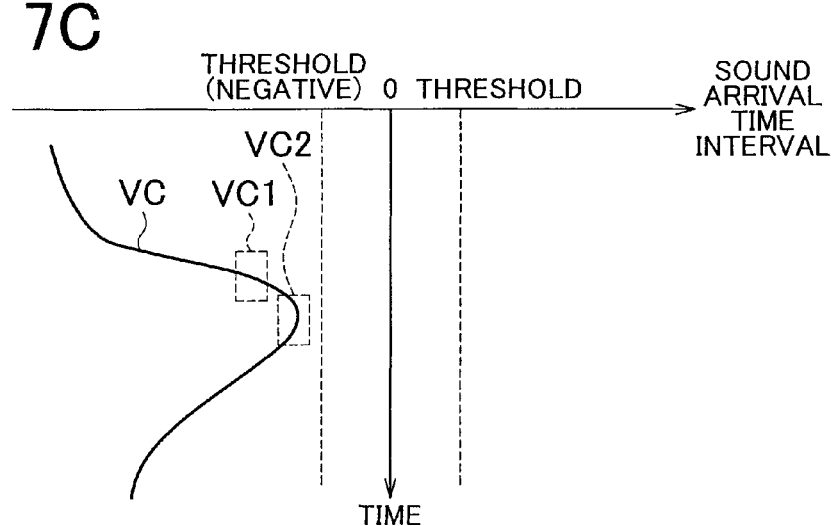

An approaching vehicle detecting system 1B according to a second embodiment will be described with reference to FIG. 5 to FIG. 7C. FIG. 5 is a configuration diagram of the approaching vehicle detecting system according to the second embodiment. FIG. 6A and FIG. 6B are arrangement views of sound collectors of a sound collector array according to the second embodiment, in which FIG. 6A shows the case where a transverse space is wide and FIG. 6B shows the case where a vertical space is wide. FIG. 7A to FIG. 7C are views that illustrate an approaching vehicle detecting method according to the second embodiment, in which FIG. 7A is a view that shows the moving direction of a sound source, FIG. 7B is a graph that shows a temporal difference in sound arrival time interval in the case where a sound source is present in the same plane as a host vehicle and FIG. 7C is a graph that shows a temporal variation in sound arrival time interval in the case where a sound source is not present in the same plane as the host vehicle.

The approaching vehicle detecting system 1B uses two sound collectors to constitute a pair of sound collectors located at different positions in the transverse direction of the host vehicle and a pair of sound collectors located at different positions in the vertical direction of the host vehicle. Then, the approaching vehicle detecting system 1B determines whether a sound source is approaching in the transverse direction on the basis of a temporal variation in the sound arrival time interval between the two sound collectors, determines whether the vertical position of the sound source is in the same plane as the host vehicle, and detects a sound source that approaches in the transverse direction in the same plane as the host vehicle as an approaching vehicle.

The approaching vehicle detecting system 1B includes a sound collector array 10B (sound collectors 11B and 12B) and an ECU 20B (a sound arrival time interval calculation unit 24 and an approaching vehicle detecting unit 25). In the second embodiment, the process executed by the approaching vehicle detecting unit 25 of the ECU 20B corresponds to the transverse determination unit and the vertical determination unit according to the aspect of the invention.

The sound collector array 10B has the two sound collectors 11B and 12B. In the sound collector array 10B, the two sound collectors 11B and 12B are used to constitute the pair of sound collectors located at different positions in the transverse direction and the pair of sound collectors located at different positions in the vertical direction.

The sound collector 11B is arranged at the right side in the transverse direction at the front end portion of the host vehicle. The sound collector 12B is arranged at the left side in the transverse direction at the front end portion of the host vehicle. The sound collector 11B is arranged above the sound collector 12B. By this arrangement, the sound collector 11B and the sound collector 12B constitute the pair of sound collectors located at different positions in the transverse direction and the pair of sound collectors located at different positions in the vertical direction.

The sound collector 11B and the sound collector 12B may be arranged such that the vertical space H1 between the sound collector 11B and the sound collector 12B is smaller than the transverse space W1 between the sound collector 11B and the sound collector 12B as shown in FIG. 6A or may be arranged such that the vertical space H2 between the sound collector 11B and the sound collector 12B is larger than the transverse space W2 between the sound collector 11B and the sound collector 12B as shown in FIG. 6B. In addition, the transverse space may be equal to the vertical space. In addition, the transverse space and the vertical space may be increased as much as possible.

A temporal variation in the sound arrival time interval between the sound collector 11B and the sound collector 12B arranged as described above will be described with reference to FIG. 7A to FIG. 7C. Here, the case where a sound source S moves from the right side of the host vehicle to the left side and approaches from the right side to the host vehicle as shown in FIG. 7A will be described. In addition, this is the case where a sound arrival time interval is calculated with reference to the left sound collector 12B.

FIG. 7B shows a temporal variation PC in the sound arrival time interval in the case where the sound source S is present in the same plane as the host vehicle. In this case, because the sound source S is present in the same plane as the host vehicle, there is almost no difference between a period of time during which a sound from the sound source S reaches the sound collector 11B and a period of time during which a sound from the sound source S reaches the sound collector 12B because of a difference in vertical position between the sound collector 11B and the sound collector 12B, but there occurs a difference between a period of time during which a sound from the sound source S reaches the sound collector 11B and a period of time during which a sound from the sound source S reaches the sound collector 12B because of a difference in transverse position between the sound collector 11B and the sound collector 12B. Thus, while the sound source S moves from the right side of the host vehicle to the right ahead of the host vehicle, a sound from the sound source S reaches the right sound collector 11B first, so the negative sound arrival time interval approaches 0 (the absolute value of the sound arrival time interval reduces). At this time, the absolute value of the sound arrival time interval continues to reduce without changing a variation in the absolute value of the sound arrival time interval (the rate of reduction in the sound arrival time interval does not decrease) in the region indicated by the sign PC1, and the absolute value of the sound arrival time interval is smaller than a threshold in the region indicated by the sign PC2. Finally, when the sound source S passes through the right ahead of the host vehicle, a sound from the sound source S reaches the sound collector 11B and the sound collector 12B simultaneously, so the sound arrival time interval is 0. Furthermore, while the sound source S is moving from the right ahead of the host vehicle to the left side, a sound from the sound source S reaches the left sound collector 12B first, so the sound arrival time interval is a positive value, and the positive sound arrival time interval increases.

FIG. 7C shows a temporal variation VC in sound arrival time interval in the case where the sound source S is not present in the same plane as the host vehicle (the sound source S is present above the host vehicle). In this case, because the sound source S is present above the host vehicle, a sound from the sound source S constantly reaches the upper sound collector 11B first because of a difference in vertical position between the sound collector 11B and the sound collector 12B, and there is a difference between a period of time during which a sound from the sound source S reaches the sound collector 11B and a period of time during which a sound from the sound source S reaches the sound collector 12B because of a difference in vertical position between the sound collector 11B and the sound collector 12B in addition to a difference in transverse position between the sound collector 11B and the sound collector 12B. Thus, while the sound source S is moving from the right side of the host vehicle to the right ahead of the host vehicle, a sound from the sound source S reaches the right sound collector 11B first. In addition, because the sound collector 11B is located on the upper side, a sound from the sound source S reaches earlier. Therefore, as shown in the region indicated by the sign VC1; a variation at which the absolute value of the sound arrival time interval reduces gradually decreases (the rate of reduction in the sound arrival time interval decreases). Finally, even when the sound source S passes through the right ahead of the host vehicle in the transverse direction of the host vehicle, a sound from the sound source S reaches the right sound collector 11B first, and the sound arrival time interval remains in a negative value. At this time, as shown in the region indicated by the sign VC2, the rate of reduction in the absolute value of the sound arrival time interval becomes 0 without bringing the absolute value of the sound arrival time interval below the threshold, and then the absolute value of the sound arrival time interval begins to increase. Furthermore, even while the sound source S is moving from the right ahead of the host vehicle to the left side in the transverse direction of the host vehicle, a sound from the sound source S reaches the right sound collector 11B first, the negative sound arrival time interval varies, and the absolute value of the sound arrival time interval increases. Such a characteristic of a temporal variation in sound arrival time interval also applies to the case where a sound source is present below the host vehicle.

When the sound source is not present in the same plane as the host vehicle, as the vertical space between the sound collector 11B and the sound collector 12B increases, the absolute value of the sound arrival time interval is hard to reduce even when the sound source approaches in the transverse direction, and the above described characteristic becomes remarkable. Particularly, in order to improve distinguishing capability against a far sound source, the vertical space between the sound collector 11B and the sound collector 12B is desirably larger.

From the above described characteristic of a temporal variation in sound arrival time interval, when the absolute value of the sound arrival time interval reduces and then increases with the same sign of the sound arrival time interval, it may be determined that the sound source is not present in the same plane as the host vehicle. On the other hand, when the absolute value of the sound arrival time interval reduces and then increases with the inversion of the sign of the sound arrival time interval (when the absolute value of the sound arrival time interval becomes smaller than the threshold), it may be determined that the sound source is present in the same plane as the host vehicle.

The ECU 20B is an electronic control unit formed of a CPU, a ROM, a RAM, and the like, and comprehensively controls the approaching vehicle detecting system 1B. In the ECU 20B, an approaching vehicle detecting application stored in the ROM is loaded onto the RAM and is executed by the CPU to thereby implement the sound arrival time interval calculation unit 24 and the approaching vehicle detecting unit 25. Then, in the ECU 20B, electric signals are respectively input from the two sound collectors 11B and 12B, and the electric signals are used to execute processings in the processing units 24 and 25 at set time intervals.

The sound arrival time interval calculation unit 24 calculates a sound arrival time interval from the cross correlation between the electric signal of the sound collector 11B and the electric signal of the sound collector 12B. At this time, it is desirable that a sound arrival time interval is calculated for only the sound source having a frequency component corresponding to the running sound of a vehicle.

The approaching vehicle detecting unit 25 calculates a variation in the sound arrival time interval $\Delta ts$ ($=|ts(t)|-|ts(t-1)|$) using a current sound arrival time interval $ts(t)$ and a previous sound arrival time interval $ts(t-1)$ each time the sound arrival time interval $ts(t)$ is calculated at set time intervals. Then, the approaching vehicle detecting unit 25 determines whether the variation in the sound arrival time interval $\Delta ts$ is smaller than 0. When the variation in the sound arrival time interval $\Delta ts$ is smaller than 0, the absolute value of the sound arrival time interval is reduced, so the approaching vehicle detecting unit 25 determines that the sound source is approaching in the transverse direction of the host vehicle.

When it is determined that the sound source is approaching in the transverse direction, the approaching vehicle detecting unit 23 determines whether the absolute value of the current sound arrival time interval ts(t) is smaller than the threshold. The threshold is a threshold for determining whether a sound source is in the same plane from the sound arrival time interval, and is set in advance by an experiment, or the like. When the absolute value of the sound arrival time interval ts(t) is smaller than the threshold, the approaching vehicle detecting unit 25 determines that the sound source is in the same plane, and determines that there is an approaching vehicle in the same plane. On the other hand, when the variation in the sound arrival time interval Δts becomes larger than or equal to 0 without bringing the absolute value of the sound arrival time interval ts(t) below the threshold, the absolute value of the sound arrival time interval increases before it becomes below the threshold (before the sign of the sound arrival time interval changes), so the approaching vehicle detecting unit 25 determines that the sound source is not in the same plane, and determines that an approaching vehicle is present above the host vehicle (on an elevated road) or below the host vehicle.

Then, the ECU 20B generates approaching vehicle information on the basis of the results determined by the approaching vehicle detecting unit 25, and transmits the approaching vehicle information to the drive assist system 2.

Figure 8:
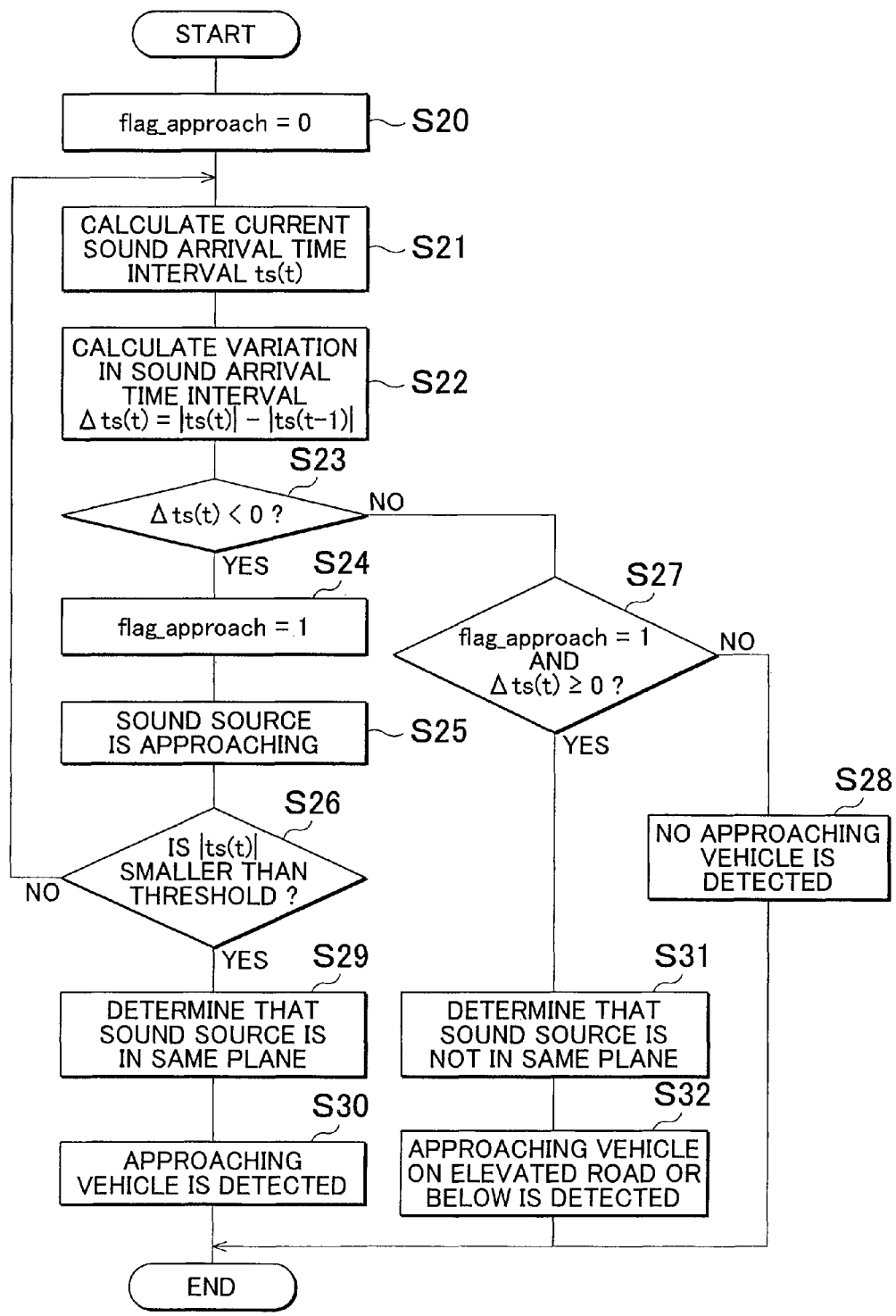
FIG. 8 is a flow chart that shows the flow of processes executed by an ECU of the approaching vehicle detecting system according to the second embodiment.

Next, the operation of the approaching vehicle detecting system 1B will be described with reference to FIG. 5 to FIG. 7C. Particularly, the processes executed in the ECU 20B will be described with reference to the flow chart shown in FIG. 8. FIG. 8 is a flow chart that shows the flow of processes executed by the ECU of the approaching vehicle detecting system according to the second embodiment. Note that, in the processes executed by the ECU 20B, flag_approach is used as a control flag. The flag_approach is set at 1 when the sound source is approaching in the transverse direction of the host vehicle, and is set at 0 when no sound source is approaching.

Each of the sound collectors 11B and 12B collects an ambient sound outside the vehicle, converts the collected sound to an electric signal and transmits the electric signal to the ECU 20B. The ECU 20B inputs the electric signals.

The ECU 20B first initializes the flag_approach to 0 (S20).

The ECU 20B uses the electric signal of the sound collector 11B and the electric signal of the sound collector 12B to calculate a current sound arrival time interval ts(t) at set time intervals (S21). Then, the ECU 20B uses the current sound arrival time interval ts(t) and the sound arrival time interval ts(t−1) calculated at the previous time to calculate a temporal variation Δts (=|ts(t)|−|ts(t−1)|) in sound arrival time interval (S22). Furthermore, the ECU 20B determines whether the temporal variation Δts in sound arrival time interval is smaller than 0 (S23).

When it is determined in S23 that the temporal variation Δts in sound arrival time interval is smaller than 0 (when the absolute value of the sound arrival time interval is small), the ECU 20B sets the flag_approach at 1 (S24), and determines that the sound source is approaching in the transverse direction (S25). Furthermore, the ECU 20B determines whether the absolute value of the current sound arrival time interval |ts(t)| is smaller than the threshold (S26).

When it is determined in S26 that the absolute value of the current sound arrival time interval |ts(t)| is smaller than the threshold (when the absolute value of the sound arrival time interval is sufficiently small), the ECU 20B determines that the approaching sound source is in the same plane as the host vehicle (S29), and detects the sound source as an approaching vehicle to the host vehicle (S30). On the other hand, when it is determined in S26 that the absolute value of the current sound arrival time interval |ts(t)| is larger than or equal to the threshold, the ECU 20B returns the process to S21, and executes the next processing after a set period of time.

When it is determined in S23 that the temporal variation Δts in sound arrival time interval is larger than or equal to 0, the ECU 20B determines whether the flag_approach is 1 and the temporal variation Δts in sound arrival time interval is larger than or equal to 0 (S27). When any one of the conditions is not satisfied in S27, the ECU 20B determines that no approaching vehicle is detected (S28).

When all the conditions are satisfied in S27 (when the absolute value of the sound arrival time interval is increased without being sufficiently reduced), the ECU 20B determines that the approaching sound source is not in the same plane as the host vehicle (S31), and it is determined that the sound source is an approaching vehicle above the host vehicle (on an elevated road) or below the host vehicle (S32).

The ECU 20B generates approaching vehicle information on the basis of the above described determination results, and transmits the approaching vehicle information to the drive assist system 2. The ECU 20B repeats the above described processes.

With the approaching vehicle detecting system 1B, the two sound collectors are used to form the pair of transversely arranged sound collectors and the pair of vertically arranged sound collectors, and the temporal variation in the sound arrival time interval between the two sound collectors is utilized to determine whether the sound source is approaching in the transverse direction and the sound source is in the same plane as the host vehicle. By so doing, it is possible to detect only an approaching vehicle in the same plane, which is likely to collide with the host vehicle, using a minimum number of the sound collectors, so the detection accuracy of an approaching vehicle improves. Particularly, this configuration may be implemented by a minimum number of the sound collectors, so cost may be reduced.

Hereinafter, various arrangements of a plurality of sound collectors that constitute a pair of sound collectors located at different positions in the vertical direction will be described.

Figure 9:
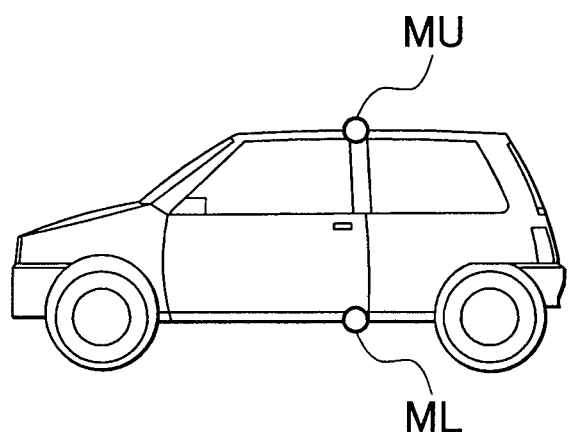
FIG. 9 is an arrangement view of another example of sound collectors of a sound collector array.

In the case of an example shown in FIG. 9, the upper sound collector MU and the lower sound collector ML that constitute a pair of sound collectors located at different positions in the vertical direction are arranged at the upper end and the lower end in the vertical range of the body of the vehicle. In the case of the above arrangement, the detection capability for a sound in the vertical direction may be maximized, and the capability of distinguishing a sound source in the vertical direction and the maximum detectable distance are maximized.

Figure 10A:
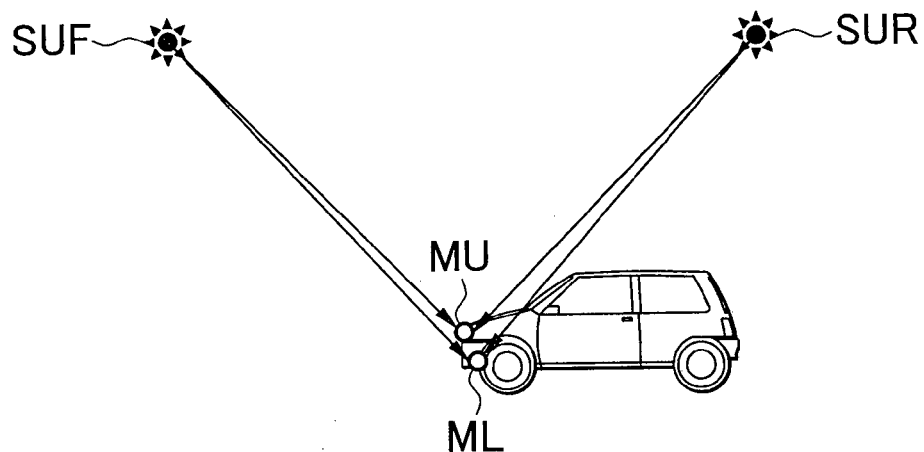
Figure 10B:
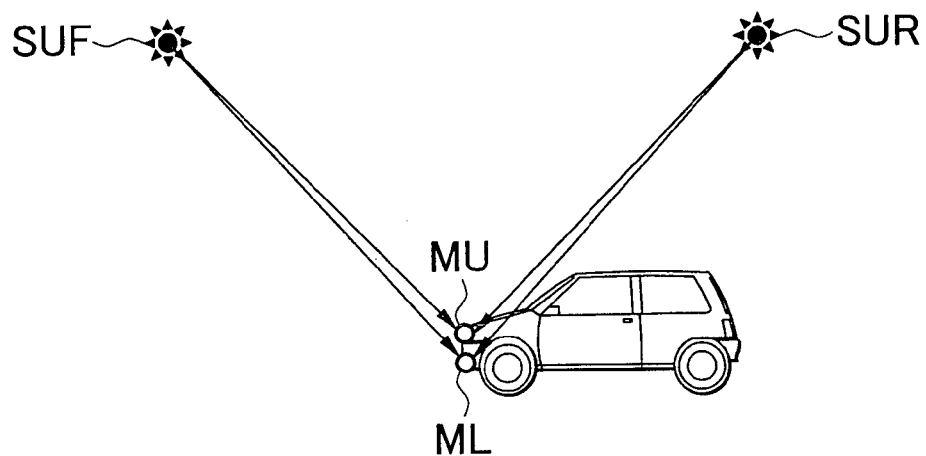

In many cases, a vehicle that approaches in the transverse direction on an elevated road ahead of the host vehicle is erroneously detected as an approaching vehicle. Thus, it is important to distinguish a sound source in the transverse direction above and in front of the host vehicle and a sound source in the transverse direction in the same plane ahead of the host vehicle from each other. However, an installation position of a sound collector on the vehicle is mostly limited because of restrictions on design, structure and cost of the vehicle, and a pair of sound collectors may not be arranged with a large vertical space. Then, as shown in FIG. 10A, the upper sound collector MU and the lower sound collector ML that constitute the pair of sound collectors located at different positions in the vertical direction are arranged such that the upper sound collector MU is arranged on the front side of the lower sound collector ML in the longitudinal direction of the host vehicle. In the case of the above arrangement, when a sound source SUF is present above and in front of the host vehicle, in comparison with the case where the upper sound collector MU and the lower sound collector ML are arranged at the same position in the longitudinal direction of the host vehicle as shown in FIG. 10B, a sound reaches the upper sound collector MU first, and the sound arrival time interval between the sound collector MU and the sound collector ML increases. As a result, the capability of distinguishing a sound source in the transverse direction above and in front of the host vehicle and a sound source in the transverse direction in the same plane ahead of the host vehicle from each other improves. Thus, when the vehicle has a limited vertical range in which sound collectors may be arranged, by arranging the sound collectors at positions shifted in the longitudinal direction, the vertical space between the sound collectors may be reduced while ensuring the capability of distinguishing a sound source in the vertical direction to a certain extent, so the flexibility of vehicle development, manufacturing and design increases. Incidentally, in the case of the above arrangement, when a sound source SUR is present above and behind the host vehicle, in comparison with the case where the upper sound collector MU and the lower sound collector ML are arranged at the same position in the longitudinal direction of the host vehicle, the sound arrival time interval between the sound collector MU and the sound collector ML reduces.

In order to obtain similar advantageous effects against not only a sound source above and in front of the host vehicle but also a sound source below and in front of the host vehicle, three sound collectors are arranged in the vertical direction to constitute two pairs of sound collectors. As shown in FIG. 11, the three sound collectors MU, MM and ML arranged in the vertical direction are used, the upper sound collector MU is arranged on the front side of the intermediate sound collector MM in the longitudinal direction of the host vehicle, and the lower sound collector ML is arranged on the front side of the intermediate sound collector MM in the longitudinal direction of the host vehicle. In the case of the above arrangement, for a sound source SUF above and in front of the host vehicle and a sound source SLR below and behind the host vehicle, the sound arrival time interval between the sound collector MU and the sound collector MM increases, so, when the pair of sound collectors formed of the sound collector MU and the sound collector MM are used, the capability of distinguishing a sound source in the vertical direction increases. On the other hand, for a sound source SLF below and in front of the host vehicle and a sound source SUR above and behind the host vehicle, the sound arrival time interval between the sound collector ML and the sound collector MM increases, so, when the pair of sound collectors formed of the sound collector ML and the sound collector MM are used, the capability of distinguishing a sound source in the vertical direction increases.

The embodiments according to the aspect of the invention are described above; however, the aspect of the invention is not limited to the above embodiments but it may be modified into various alternative embodiments.

For example, in the present embodiments, the aspect of the invention is applied to an approaching vehicle detecting system that is equipped for a vehicle and that provides detected approaching vehicle information to a drive assist system; instead, the configuration of the approaching vehicle detecting system may be another configuration. For example, the aspect of the invention may be assembled into a drive assist system as an approaching vehicle detecting function or an approaching vehicle detecting system may have an alarm function.

In addition, in the present embodiments, the pair of right and left sound collectors and the pair of upper and lower sound collectors are arranged at the front end portion of the host vehicle in order to mainly detect an approaching vehicle ahead of the host vehicle; instead, the pair of upper and lower sound collectors and the pair of right and left sound collectors may be arranged at the rear end portion of the host vehicle in order to mainly detect an approaching vehicle behind the host vehicle.

In addition, in the present embodiment, some examples of the number of sound collectors and the arrangement positions of the sound collectors for arrangement of the pair of upper and lower sound collectors and the pair of right and left sound collectors are described; instead, as long as at least a pair of sound collectors located at different positions in the vertical direction and a pair of sound collectors located at different positions in the transverse direction are provided, other various configurations may be applied to the number of sound collectors and the arrangement positions of the sound collectors.

The invention claimed is:

1. An approaching vehicle detecting system that detects an approaching vehicle on the basis of sounds collected by a plurality of sound collectors mounted on a host vehicle, comprising:
   a transverse determination unit configured to determine whether a transverse moving direction in a vehicle widthwise direction of a sound source detected using the plurality of sound collectors is a direction approaching the host vehicle; and
   a vertical determination unit configured to determine whether a vertical position of the sound source detected using the plurality of sound collectors is in the same plane as that of the host vehicle, wherein
   when the transverse determination unit determines that the transverse moving direction of the sound source is the direction approaching the host vehicle and the vertical determination unit determines that the vertical position of the sound source is in the same plane as that of the host vehicle, the sound source is detected as the approaching vehicle.

2. The approaching vehicle detecting system according to claim 1, wherein the vertical determination unit determines that the vertical position of the sound source is in the same plane as that of the host vehicle when an arrival time interval between sounds respectively collected by the sound collectors arranged at different positions in the vertical direction of the host vehicle is smaller than or equal to a threshold.

3. The approaching vehicle detecting system according to claim 1, wherein the vertical determination unit determines whether the vertical position of the sound source is in the same plane as that of the host vehicle on the basis of a variation in an arrival time interval between sounds respectively collected by the sound collectors arranged at different positions in the vertical direction of the host vehicle and different positions in the transverse direction of the host vehicle.

4. The approaching vehicle detecting system according to claim 1, wherein the plurality of sound collectors include at least one pair of sound collectors arranged at different positions in the vertical direction of the host vehicle and at least one pair of sound collectors arranged at different positions in the transverse direction of the host vehicle.

5. The approaching vehicle detecting system according to claim 4, wherein the at least one pair of upper sound collector and lower sound collector located at different positions in the vertical direction are arranged at different positions in a longitudinal direction of the host vehicle.

6. The approaching vehicle detecting system according to claim 5, wherein the at least one pair of upper sound collector and lower sound collector located at different positions in the vertical direction are arranged such that the upper sound collector is arranged on a front side of the lower sound collector with respect to the host vehicle.

7. The approaching vehicle detecting system according to claim 5, wherein the at least one pair of upper sound collector and lower sound collector located at different positions in the vertical direction are arranged such that the lower sound collector is arranged on a front side of the upper sound collector with respect to the host vehicle.

8. The approaching vehicle detecting system according to claim 5, wherein the at least one pair of upper sound collector and lower sound collector comprises three sound collectors located at different positions in the vertical direction to constitute two pairs of sound collectors including a pair of sound collectors in which the upper sound collector is arranged on a front side of the lower sound collector with respect to the host vehicle and a pair of sound collectors in which the lower sound collector is arranged on the front side of the upper sound collector with respect to the host vehicle.

9. The approaching vehicle detecting system according to claim 4, wherein the at least one pair of sound collectors located at different positions in the vertical direction and the at least one pair of sound collectors located at different positions in the transverse direction are formed of different sound collectors.

10. The approaching vehicle detecting system according to claim 4, wherein the at least one pair of sound collectors located at different positions in the vertical direction and the at least one pair of sound collectors located at different positions in the transverse direction are formed of sound collectors that are partially shared between the at least one pair of sound collectors located at different positions in the vertical direction and the at least one pair of sound collectors located at different positions in the transverse direction.

11. The approaching vehicle detecting system according to claim 4, wherein the at least one pair of sound collectors located at different positions in the vertical direction and the at least one pair of sound collectors located at different positions in the transverse direction are formed of sound collectors that are entirely shared between the at least one pair of sound collectors located at different positions in the vertical direction and the at least one pair of sound collectors located at different positions in the transverse direction.

12. An approaching vehicle detecting method that detects an approaching vehicle on the basis of sounds collected by a plurality of sound collectors mounted on a host vehicle, comprising:

determining whether a transverse moving direction in a vehicle widthwise direction of a sound source detected using the plurality of sound collectors is a direction approaching the host vehicle;

determining whether a vertical position of the sound source detected using the plurality of sound collectors is in the same plane as that of the host vehicle; and when it is determined that the transverse moving direction of the sound source is the direction approaching the host vehicle and it is determined that the vertical position of the sound source is in the same plane as that of the host vehicle, detecting the sound source as the approaching vehicle.

13. The approaching vehicle detecting method according to claim 12, wherein it is determined that the vertical position of the sound source is in the same plane as that of the host vehicle when an arrival time interval between sounds respectively collected by the sound collectors arranged at different positions in the vertical direction of the host vehicle is smaller than or equal to a threshold.

14. The approaching vehicle detecting method according to claim 12, wherein it is determined whether the vertical position of the sound source is in the same plane as that of the host vehicle on the basis of a variation in an arrival time interval between sounds respectively collected by the sound collectors arranged at different positions in the vertical direction of the host vehicle and different positions in the transverse direction of the host vehicle.

* * * * *